(12) United States Patent
Bortolozzo et al.

(10) Patent No.: US 9,791,302 B2
(45) Date of Patent: Oct. 17, 2017

(54) SENSOR WITH HIGH-SENSITIVITY OPTICAL FIBER HAVING A HOLOGRAPHIC DETECTOR COMPRISING A LIQUID CRYSTAL LIGHT VALVE

(71) Applicants: THALES, Courbevoie (FR); CENTRE NATIONAL DE LA RECHERCHE SCIENTIFIQUE, Paris (FR)

(72) Inventors: Umberto Bortolozzo, Juan-les-Pins (FR); Jean-Pierre Huignard, Paris (FR); Stefania Residori, Juan-les-Pins (FR); Stéphanie Molin, Draveil (FR); Daniel Dolfi, Orsay (FR)

(73) Assignees: THALES, Courbevoie (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 44 days.

(21) Appl. No.: 15/033,424

(22) PCT Filed: Nov. 14, 2014

(86) PCT No.: PCT/EP2014/074561
§ 371 (c)(1),
(2) Date: Apr. 29, 2016

(87) PCT Pub. No.: WO2015/071392
PCT Pub. Date: May 21, 2015

(65) Prior Publication Data
US 2016/0282150 A1    Sep. 29, 2016

(30) Foreign Application Priority Data
Nov. 18, 2013  (FR) ...................... 13 02640

(51) Int. Cl.
*G01H 9/00* (2006.01)
*G01D 5/353* (2006.01)
*G01B 9/02* (2006.01)

(52) U.S. Cl.
CPC ..... *G01D 5/35306* (2013.01); *G01B 9/02049* (2013.01); *G01H 9/004* (2013.01)

(58) Field of Classification Search
CPC ............ G01B 9/02091; G01B 9/02023; G01B 9/021; G01B 9/02027; G01B 9/02044;
(Continued)

(56) References Cited

U.S. PATENT DOCUMENTS 4,536,861 A   8/1985  Graindorge et al.
5,072,113 A * 12/1991  Martinelli .......... G01D 5/35383
                                                  250/227.16
(Continued)

OTHER PUBLICATIONS

R. Bouffaron et al., "All-optical acoustic array for underwater surveillance," Proceedings of SPIE, vol. 8794, May 20, 2013, pp. 87940N, XP055133779.
(Continued)

*Primary Examiner* — Que T Le
(74) *Attorney, Agent, or Firm* — Baker & Hostetler LLP

(57) ABSTRACT

An optical fiber sensor for locating an excitation in proximity to an optical fiber assembly comprises: a laser assembly configured to emit N laser beams indexed i with N>1, of respective emission wavelength $\lambda i$, an optical fiber assembly comprising N successive sections indexed i, an optical system configured to: inject the laser beams, receive N signal beams indexed i respectively of wavelengths $\lambda i$, generate N reference beams indexed i respectively of wavelengths $\lambda i$, produce N interference areas indexed i, a holographic detector comprising: a liquid crystal light valve that at least partially covers the interference areas, and is configured to produce N holograms indexed i from, respec-
(Continued)

tively, N interference areas, at least one optical detector configured to detect N output optical signals indexed I, a processing unit adapted to identify the section of the fiber assembly situated in proximity to the excitation to be located.

15 Claims, 7 Drawing Sheets

(58) Field of Classification Search
CPC ............. G01D 5/35316; G01D 5/3538; G01D 5/35303; G01D 5/35306; G01D 5/35367; G01H 9/004; G01H 9/006; G01H 9/02091
USPC .......................... 250/227.14, 227.11, 227.18
See application file for complete search history.

(56) References Cited

U.S. PATENT DOCUMENTS

| | | |
|---|---|---|
| 5,694,216 A | 12/1997 | Riza |
| 2011/0320147 A1 | 12/2011 | Brady et al. |
| 2012/0226452 A1 | 9/2012 | Hill et al. |

OTHER PUBLICATIONS

U. Bortolozzo et al., "Adaptative Holography in Liquid Crystal Light-Valves," Materials 2012, vol. 5, pp. 1546-1559.

\* cited by examiner

SENSOR WITH HIGH-SENSITIVITY OPTICAL FIBER HAVING A HOLOGRAPHIC DETECTOR COMPRISING A LIQUID CRYSTAL LIGHT VALVE

CROSS-REFERENCE TO RELATED APPLICATIONS

This application is a National Stage of International patent application PCT/EP2014/074561, filed on Nov. 14, 2014, which claims priority to foreign French patent application No. FR 1302640, filed on Nov. 18, 2013, the disclosures of which are incorporated by reference in their entirety.

FIELD OF THE INVENTION

The present invention relates to the field of optical fiber sensors. More specifically, the invention relates to sensors suitable for detecting an excitation in proximity to the fiber and for locating this excitation along the fiber in a noisy environment.

BACKGROUND

Quasi-distributed optical fiber sensors are known from the prior art, for example for the underwater detection of acoustic waves (coastline surveillance, seismic activity monitoring, etc.) or the detection of pressure variation in the air.

These sensors are widely used for their compactness and their sensitivity.

The most sensitive are based on active (laser) Bragg gratings coupled to a mechanical transducer which converts the radial pressure of the acoustic wave into elongation of the fiber, leading to a modulation of the optical wavelength at the fiber output.

For example, the distributed feedback fiber laser (DFB-FL) sensor as described in the publication "All optical array for underwater surveillance", European Conference Workshop on Optical Fiber Sensors EWOFS 2013, Krakow, Poland, Proceeding SPIE Vol. 879487940N-1, comprises an optical fiber in which a plurality of Bragg gratings have been registered, producing a plurality of laser cavities suitable for each lasering on a wavelength $\lambda i$, each cavity forming a sensor.

The principle of operation of the distributed feedback fiber laser sensor is based on the axial deformation of the laser cavity, which modulates the frequency of the laser. The acoustic signal axially deforms the sensitive center of the laser cavity. The deformation causes the optical phase of the cavity, and therefore the resonant frequency thereof, and its emission optical frequency, to be modulated.

An acoustic wave located in proximity to the fiber is transformed into elongation, which induces a modulation of the emission wavelength of the laser situated in the fiber and in proximity to the acoustic wave. The light from the lasers is recovered at the fiber output and coupled to an interferometer, then injected into a wavelength demultiplexer to identify which laser has undergone the change of wavelength, and determine therefrom the direction of arrival of the acoustic wave. These sensors are capable of detecting the picostrain, i.e. relative variations of $\Delta L/L \sim 10^{-12}$.

These sensors and systems based on Bragg gratings are intrinsically sensitive to the variations of the environment, typically temperature and static pressure, which places strong constraints on their design. The mechanical structure in which the cavity is housed is configured so that, when the temperature varies, it undergoes a deformation leading to a variation of the length of the cavity which neutralizes that induced by the static pressure variations. The mechanical structure also has a number of orifices for equalizing the static pressures, making it possible to avoid a bulky hydrostatic filter.

Furthermore, accurate interferometric measurements have to be performed to transform the modulation of the optical frequency into a phase modulation. The technique used is, for example, of the delayed self-homodyne type and requires a great length of delay line (optical fiber capable of introducing phase noise on the signal) and at least one frequency translation (acousto-optical or electro-optical element inducing losses). These measurements further require a feedback loop to neutralize the slow variations of the length of the fiber delay line and keep the interferometer in a linear zone of operation (quadrature) that is stable and of maximum sensitivity.

Thus, the use of an interferometer constitutes a limitation on the practical implementation of the systems, particularly when the detection has to be executed in a fluctuating environment.

These sensors are also expensive, because they consist of laser cavities that are costly to fabricate and to implement.

Aim of the Invention

The aim of the invention is to produce an optical fiber sensor that makes it possible to locate an excitation in proximity to the fiber, the excitation inducing a phase modulation of an optical signal propagating in the fiber, the sensor exhibiting a very great sensitivity and making it possible to remedy the abovementioned drawbacks.

DESCRIPTION OF THE INVENTION

The subject of the present invention is an optical fiber sensor for locating an excitation in proximity to an optical fiber assembly, the excitation inducing a modulation of the phase of an optical signal propagating in the optical fiber assembly, the sensor comprising:
  a laser assembly of at least one laser, the laser assembly being configured to emit N laser beams indexed i with N>1, of respective emission wavelength $\lambda i$,
  an optical fiber assembly comprising N successive sections indexed i, each section comprising a selective reflection device for an associated emission wavelength $\lambda i$, the indexes being fixed relative to an end of the fiber assembly,
  an optical system configured to:
  inject, through said end, the laser beams
  receive, through the end, N signal beams indexed i respectively of wavelengths $\lambda i$, each signal beam being derived from the reflection, on the reflection device associated with the wavelength $\lambda i$, of the laser beam of wavelength $\lambda i$ injected then propagating in the fiber assembly,
  generate N reference beams indexed i respectively of wavelengths $\Delta i$, from the laser beam of emission wavelength $\lambda i$,
  produce N interference areas indexed i, each area corresponding to the interference between a reference beam and a signal beam of the same emission wavelength $\lambda i$,
  a holographic detector comprising:
  a liquid crystal light valve comprising a liquid crystal layer arranged between two substrates, one of the substrates comprising a photoconductive material for said N emission wavelengths, the valve being arranged such that it at least partially covers the interference areas, the valve being configured to produce N holograms indexed i respectively from the N interference areas, at least one optical detector configured to detect N output optical signals indexed i diffracted respectively by the N holograms, a processing unit adapted to identify the section of the fiber assembly situated in proximity to the excitation to be located, from the N output optical signals detected.

Preferentially, the processing unit is adapted to identify the section by determining, from the N output optical signals detected, the output optical signal of lowest index exhibiting the phase modulation, the section to be identified corresponding to the section having the lowest index.

Preferentially, the phase modulation of the output optical signal corresponds to a temporal modulation of an intensity of the output optical signal detected.

According to one embodiment, the reflection device comprises a dichroic mirror and the optical fiber assembly comprises N optical fibers, each fiber and the associated dichroic mirror corresponding to a section.

According to another embodiment, the optical fiber assembly is formed by a single fiber and each reflection device comprises a Bragg reflector incorporated in the fiber.

According to one embodiment, the laser assembly consists of a single laser sequentially emitting the emission wavelengths ($\lambda 1, \lambda 2, \ldots \lambda N$).

According to another embodiment, the laser assembly comprises a plurality of N lasers, each laser respectively emitting an emission wavelength.

According to one embodiment, the sensor according to the invention comprises N optical detectors indexed i, each detector being adapted to respectively detect an output optical signal of emission wavelength $\lambda i$, the detection taking place simultaneously for all the detectors.

According to another embodiment, the sensor according to the invention comprises a single optical detector adapted to sequentially detect the output optical signals.

According to a variant, the optical fiber assembly is multimode.

According to another variant, the optical fiber assembly is single-mode and polarization maintaining.

Preferentially, the optical fiber assembly is submerged and the excitation to be located is an underwater acoustic wave.

According to another aspect, the invention relates to a method for locating an excitation in proximity to an optical fiber assembly, the excitation inducing a modulation of the phase of an optical signal propagating in the optical fiber assembly, comprising the steps consisting in:

emitting N laser beams indexed i with N>1, of respective emission wavelength $\lambda i$, injecting said N laser beams into an optical fiber assembly, through an end of the assembly, the optical fiber assembly comprising N successive sections, indexed i, each section comprising a selective reflection device for an associated emission wavelength $\lambda i$, the indexes being fixed relative to the end of said fiber, receiving, through the end, N signal beams indexed i respectively of wavelengths $\lambda i$, each signal beam being derived from the reflection, on the reflection means associated with the wavelength $\lambda i$, of the laser beam of wavelength $\lambda i$ injected then propagating in said fiber assembly, generating N reference beams indexed i respectively of wavelengths $\lambda i$, from the laser beam (Fi) of emission wavelength $\lambda i$, producing N interference areas indexed i, each area corresponding to the interference between a reference beam and a signal beam of the same emission wavelength $\lambda i$, producing N holograms indexed i from the N interference areas with a liquid crystal light valve comprising a liquid crystal layer arranged between two substrates, one of the substrates comprising a photoconductive material for the N emission wavelengths ($\lambda i$), the valve being arranged such that it at least partially covers the interference areas, detecting N output optical signals indexed i diffracted respectively by the N holograms, identifying the section of the optical fiber assembly situated in proximity to the excitation to be located, from the N output optical signals detected.

Preferentially, the identification step of the method according to the invention comprises a step consisting in determining, from the N output optical signals detected, the output optical signal of lowest index exhibiting the phase modulation, the section to be identified corresponding to the section having the lowest index.

Preferentially, the step of determination of the output optical signal of lowest index exhibiting the phase modulation comprises a step consisting in analyzing, for the N output optical signals, respectively, a temporal modulation of the intensity detected.

BRIEF DESCRIPTION OF THE DRAWINGS

Other features, aims and advantages of the present invention will become apparent on reading the following detailed description and in light of the attached drawings given as nonlimiting examples and in which.

DETAILED DESCRIPTION OF THE INVENTION

Figure 1:
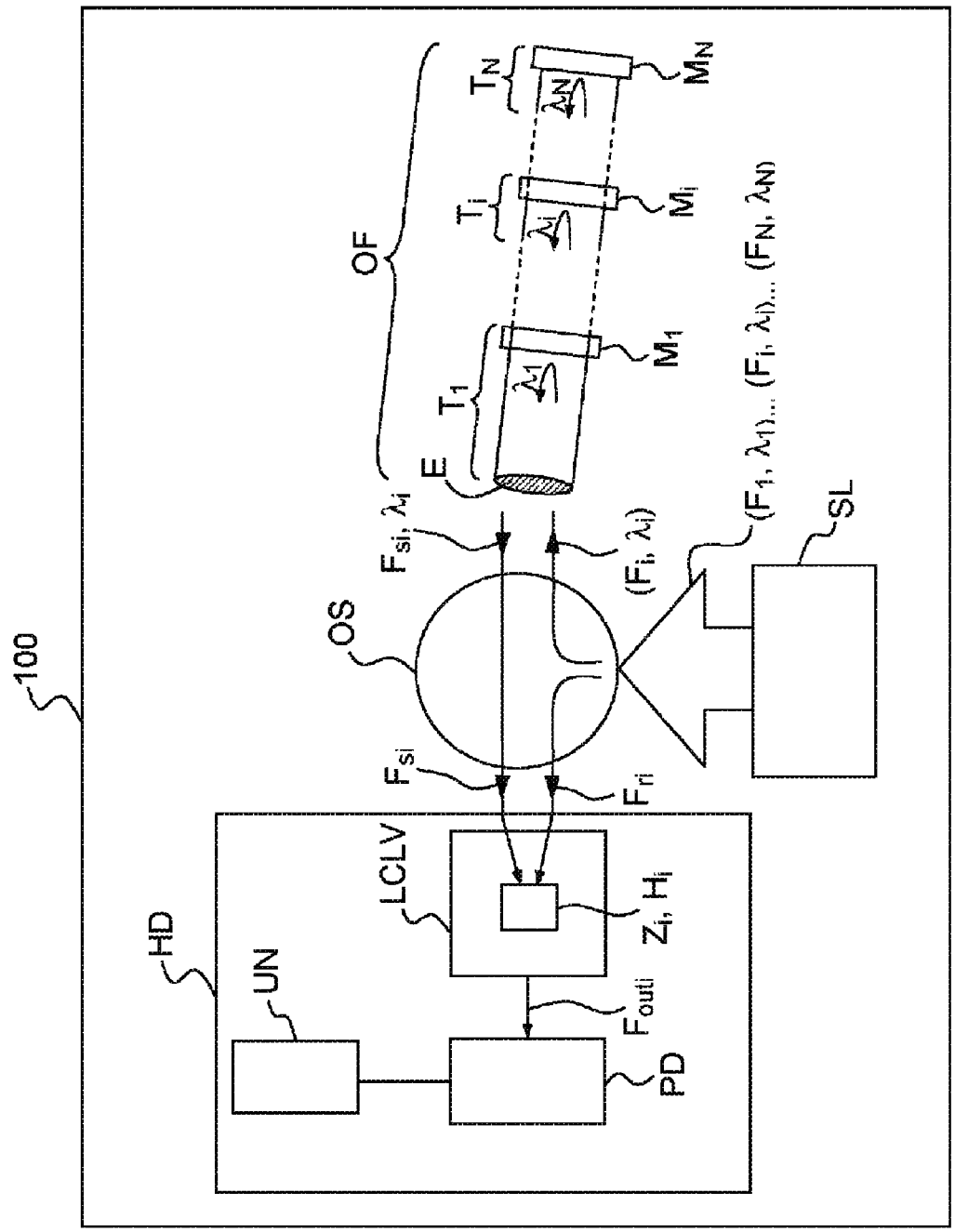
FIG. 1 illustrates a sensor according to the invention.

FIG. 1 illustrates a sensor 100 according to the invention.

The sensor 100 is suitable for locating an excitation in proximity to an optical fiber assembly OF. The excitation that the sensor detects is such that it induces a modulation of the phase of an amplitude $\Delta\phi$ of an optical signal propagating in the optical fiber assembly OF. The excitation corresponds for example to a pressure variation, in the air (sensor of microphone type) or in the water (sensor of hydrophone type) typically at a frequency greater than a few Hz.

The sensor 100 described in FIG. 1 comprises an optical fiber assembly OF structured as a sensitive element and a holographic detector with liquid crystal light valve. Its principle consists in detecting the variations of phase (due to an elongation of the fiber provoked by the excitation to be located) of at least one mode propagating in the optical fiber assembly using a holographic detector based on a liquid crystal light valve. The sensor also comprises a processing unit applying a location protocol.

The sensor 100 according to the invention comprises a laser assembly SL of at least one laser source, the laser assembly SL being configured to emit N laser beams Fi indexed i with N>1, of respective emission wavelength $\lambda i$. Thus, the laser assembly SL emits a plurality of laser beams F1, F2 . . . Fi, . . . FN each having an associated emission wavelength $\Delta 1$, $\Delta 2$, $\Delta i$, . . . , $\Delta N$.

Figure 4:
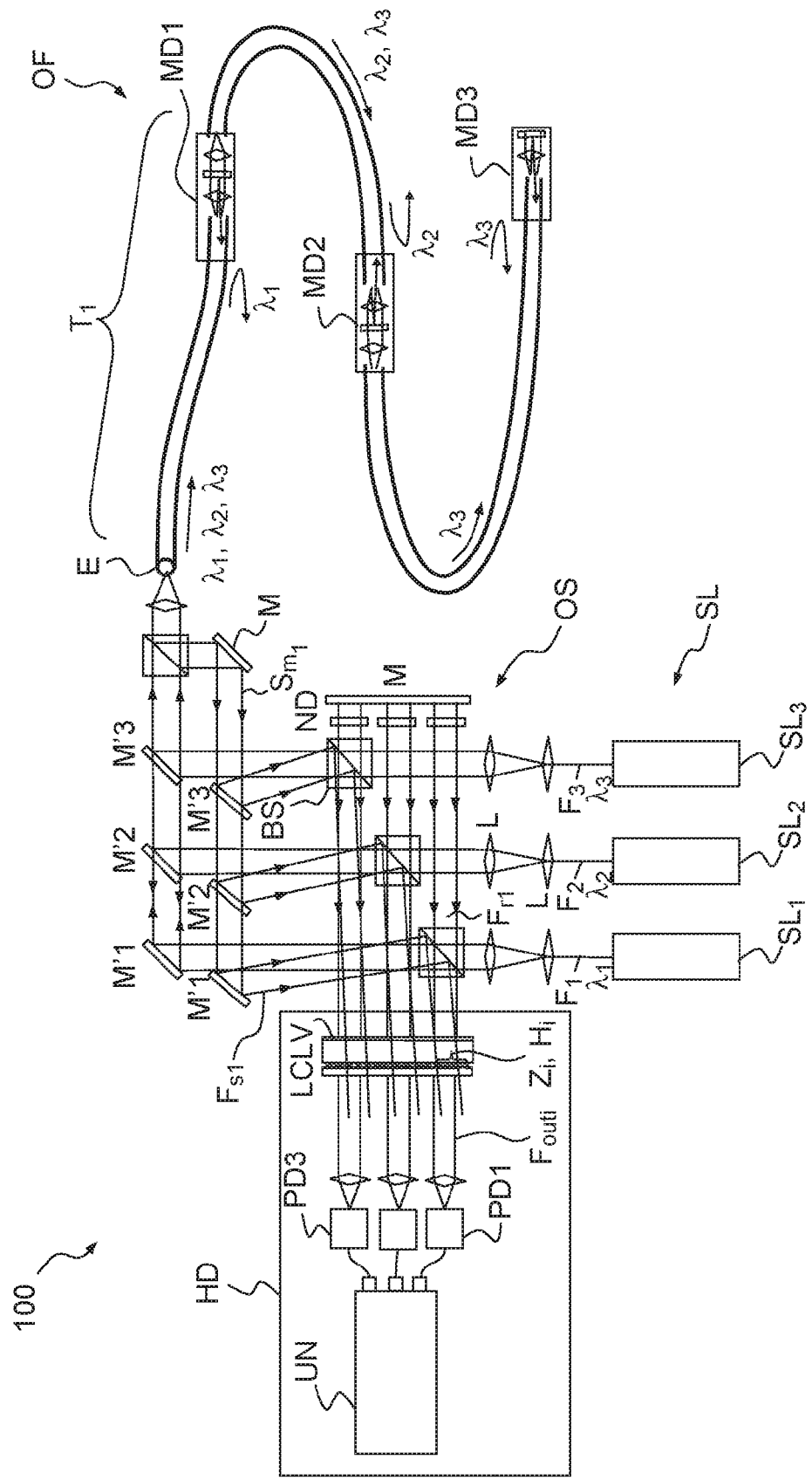
FIG. 4 illustrates a sensor according to the invention according to a first embodiment.

According to an embodiment illustrated in FIG. 4, the laser assembly comprises a plurality of laser sources SL1, SL2 . . . SLi, SLN, each emitting an emission wavelength $\lambda 1$, $\lambda 2$, $\lambda i$, . . . , $\lambda N$, the lasers emitting simultaneously. As a variant, at least one laser of the plurality of lasers emits a number of wavelengths.

Figure 8:
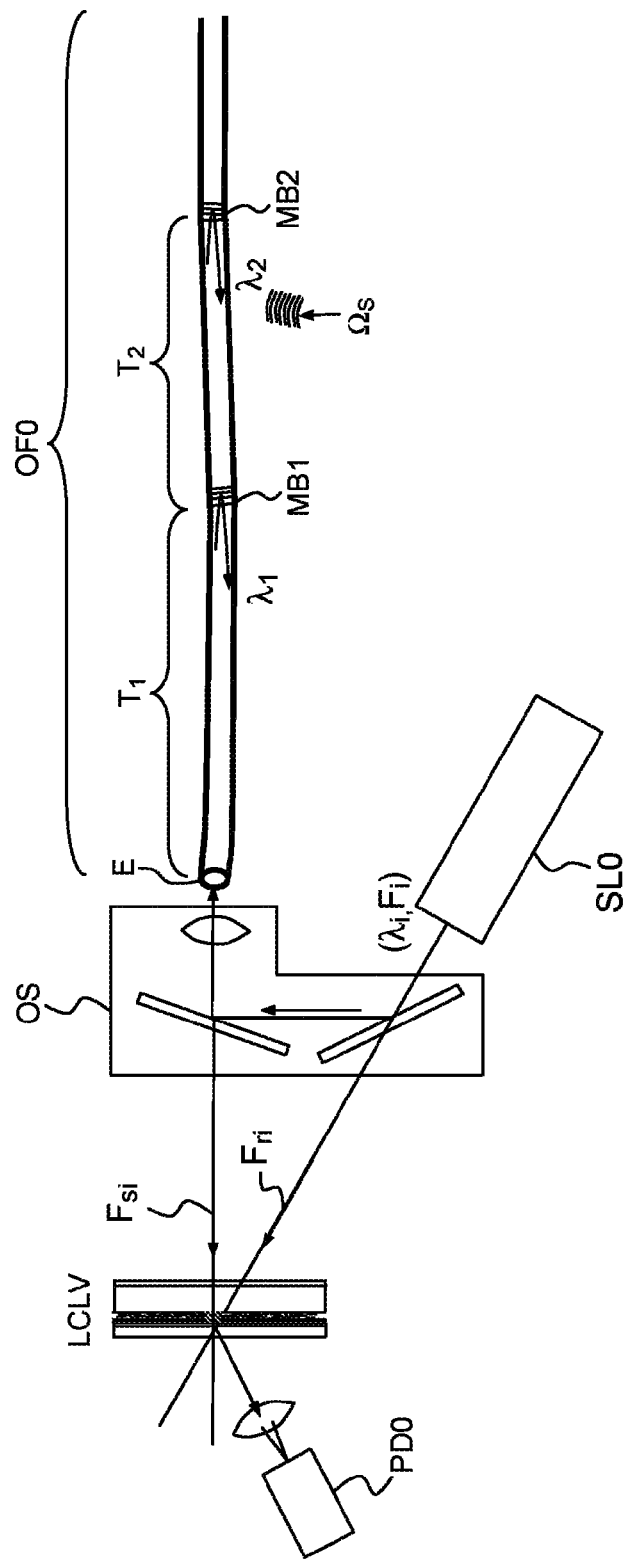
FIG. 8 illustrates a sensor according to the invention according to a second embodiment.

According to another embodiment illustrated in FIG. 8, the laser assembly comprises a single wavelength-tunable laser SL0 suitable for emitting the wavelengths $\lambda 1$, $\lambda 2$, $\lambda i$, . . . , $\lambda N$ sequentially in time. As a variant, the assembly comprises at least two tunable lasers, each tunable laser being suitable for sequentially emitting a plurality of wavelengths.

The sensor 100 also comprises an optical fiber assembly OF comprising N successive sections Ti indexed i, each section comprising a selective reflection device Mi suitable for reflecting an associated emission wavelength $\lambda i$, that is to say, the reflection of which is centered on the wavelength $\lambda i$. The reflection devices are typically spaced apart by a distance d. Each section of length d corresponds to a sensitive part of the sensor.

The indexes i are fixed relative to an end E of the fiber assembly OF situated on the side of the laser assembly: the section T1 reflecting the wavelength $\lambda 1$ corresponds to the first section, i.e. the section closest to the end E, the section TN reflecting the wavelength $\lambda N$ corresponds to the last section, i.e. the section furthest away from the end E.

Figure 5:
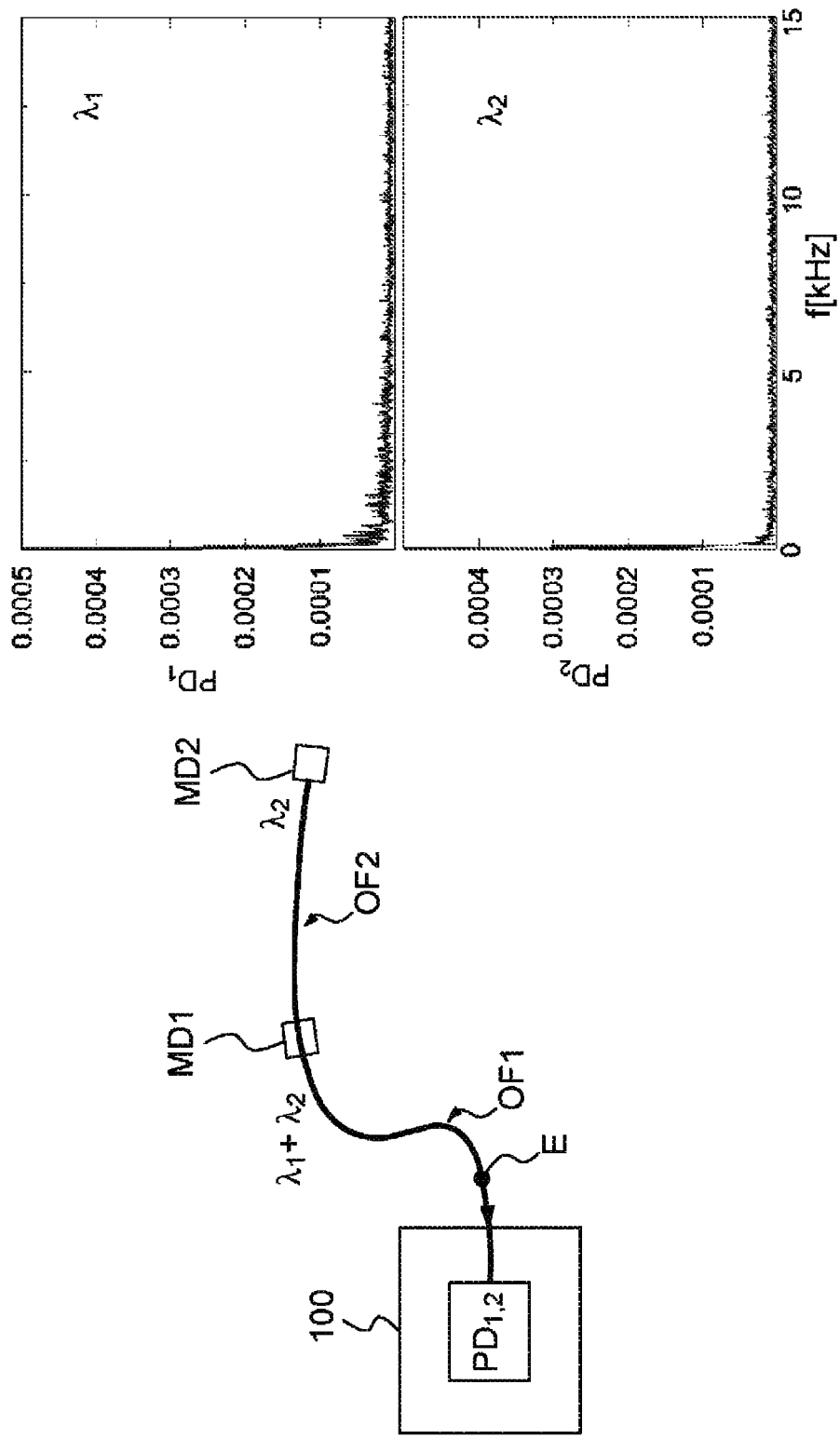
FIG. 5 illustrates an example of detection when no excitation is present.

According to an embodiment illustrated in FIG. 5, each reflection device Mi comprises a dichroic mirror MDi. Preferentially in this case, the optical fiber assembly comprises N optical fibers OF1, OF2 . . . OFN, each fiber OFi and the associated dichroic mirror MDi corresponding to a section Ti.

According to another embodiment illustrated in FIG. 8, each reflection device Mi comprises a Bragg reflector MBi. Preferentially in this case, the optical fiber assembly OF is formed by a single fiber OF0, the Bragg reflectors MBi being incorporated in the fiber OF0 using registration means known from the prior art.

The sensor 100 according to the invention further comprises an optical system OS configured to perform a set of optical functions.

First of all, the optical system OS is configured to inject, through the end E of the optical fiber assembly OF, the laser beams Fi emitted by the laser assembly SL, which will then be propagated in the fiber. The beam of wavelength $\lambda 1$ passes through the first section T1 and is reflected on the reflection device M1. The other beams of wavelength $\lambda 2$, . . . , $\lambda i$, . . . , $\lambda N$ pass through the second section T2. The beam of wavelength $\lambda 2$ is reflected on the reflection device M2 and so on until the last beam of wavelength $\lambda N$ which is the only one to pass through the last section TN and is reflected on the reflection device MN.

Furthermore, the optical system OS is configured to receive, through the end E, the N signal beams Fsi indexed i of wavelength $\lambda i$ at the output of the optical fiber assembly OF. Each signal beam Fsi is derived from the reflection, on the reflection means Mi associated with the wavelength $\lambda i$, of the laser beam Fi of wavelength $\lambda i$ injected then propagated in the different sections of the optical fiber assembly OF, as described above.

The optical system OS is also configured to generate N reference beams Fri indexed i of wavelengths $\lambda i$, from the laser beam Fi of emission wavelength $\lambda i$.

With the reference beams Fri and the signal beams Fsi, the optical system OS is configured to produce N interference areas Zi indexed i, each area corresponding to the interference between a reference beam Fri and a signal beam Fsi of the same emission wavelength $\lambda i$. Thus, an interference area Zi corresponds to the interference between the reference beam Fri derived directly from the laser on the one hand, and the injected signal beam Fsi, propagated in the optical fiber assembly on the other hand, both of wavelength $\lambda i$. The interference of Fri and Fsi gives birth to an array of intensity fringes in the area Zi.

The N interference areas Zi are separate, or adjacent, or partially overlapping, or located in a same point in space.

The sensor according to the invention also comprises a holographic detector HD comprising a number of elements.

A first element is a liquid crystal light valve LCLV known from the prior art for its capacity to produce holograms by the transformation of the variation of intensity of an interference figure into a variation of index of the liquid crystal, thus inducing a variation of optical phase.

Figure 2:
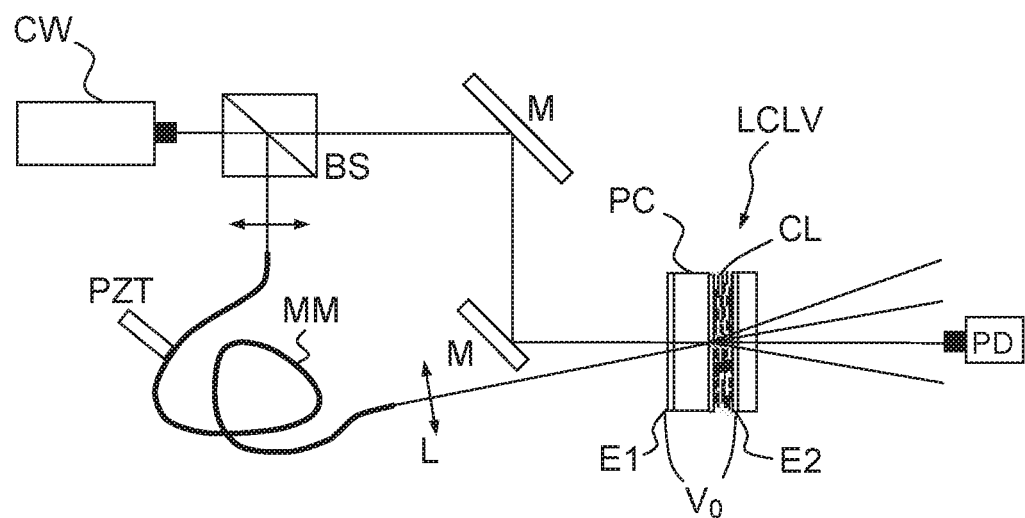
FIG. 2 illustrates the known principle of use of a liquid crystal valve to produce two wave mixing, one of the waves being temporally and spatially complex.

As illustrated in FIG. 2, the LCLV comprises a thin layer of liquid crystal LC, typically of a thickness lying between 10 and 200 µm, arranged between two substrates, one of the substrates comprising a photoconductive material PC suitable for transforming the light originating from the N emission wavelengths $\lambda i$ into charge.

For example, the layer of liquid crystals is situated between a glass substrate and a substrate consisting of a photoconductive crystal, for example a crystal of BSO, sensitive in the blue/green wavelengths. Electrodes E1 and E2 are deposited on the substrates.

There now follows a description of the principle of operation of an LCLV.

The liquid crystals LC are anisotropic organic molecules, characterized by a strong birefringency. For nematic liquid crystals, in the nematic phase all the liquid crystal molecules are on average aligned along a preferential direction. When a voltage is applied to the electrodes, because of the dielectric anisotropy of the liquid crystal, a dipolar moment is induced and the molecules are reoriented parallel to the applied field.

The photoconductive material is characterized by a great difference in resistivity between the "on" state (that is to say lit) and the "off" state (that is to say without illumination). When a light beam is sent to the LCLV, charges are photogenerated on the surface of the photoconductor, the effective voltage on the liquid crystals increases and the molecules are reoriented. Because of the birefringency of the liquid crystals, the outgoing beam acquires a phase shift, which is a function both of the voltage applied to the LCLV and of the intensity on the photoconductor. The refractive index (i.e. the phase shift) can therefore be controlled locally by the light intensity. In the linear part of the response of the phase shift as a function of the intensity, the LCLV behaves as a nonlinear medium of Kerr type, providing a change of refractive index proportional to the input intensity.

The two beams per wavelength $\lambda i$, Fri and Fsi, interfere in the plane of the photoconductor, giving birth to an array of intensity fringes. This illumination array provokes the orientation of the liquid crystal molecules, which results in the formation of a grating of refractive index whose amplitude is proportional to the input intensity by the bias of the nonlinear coefficient n2. The adaptive hologram is therefore constructed, for each wavelength λi, by making the speckle signal Fsi from the fiber assembly, bearing the phase information to be detected, interfere with a reference beam Fri.

The LCLV valve is arranged such that it at least partially covers the interference areas Zi.

Thus, the valve is configured to produce, in the liquid crystal layer LC, N dynamic and adaptive holograms Hi indexed i, one hologram per wavelength λi, from, respectively, the interference areas Zi.

For each wavelength λi, the hologram Hi diffracts a number of beams from the diffraction of the marking beams Fri and Fsi.

In effect, these two beams are diffracted by the grating of index that they have marked in the LC layer: this is called two-wave mixing between a pump beam (the reference) and a signal beam.

This layer is thin (typically between 10 and 200 μm), consequently the diffraction occurs in the Raman-Nath regime and a number of orders of diffraction are observed at the output of the LCLV. A part of the pump photons are transferred on the diffracted orders and, in particular, some are transferred toward the signal, which therefore results in being amplified. The detection is made normally on the direction of the signal or the direction of the pump, but can also be made on the direction of the higher orders of diffraction, as explained below.

The holographic detector HD of the sensor 100 according to the invention also comprises at least one optical detector PD, typically a photodiode, configured to detect N output optical signals Fouti indexed i diffracted respectively by the N holograms Hi. With the holograms Hi operating typically in a Raman-Nath diffraction regime, the detection can take place on different diffractive beams.

According to one embodiment, the optical detector is arranged in such a way as to detect, for each wavelength, the diffracted beam derived from the signal beam Fsi (in the same direction).

According to another embodiment, the optical detector is arranged in such a way as to detect, for each wavelength, the diffracted beam derived from the reference or pump beam Fri (in the same direction).

According to another embodiment, the optical detector is arranged in such a way as to detect, for each wavelength, a higher order diffracted beam.

The capacity of an LCLV to detect, by interference, a phase modulation Δφ induced in an optical fiber has been demonstrated in the publication "Adaptative Holography in Liquid Crystal Light-Valves", journal materials 2012, 5, 1546-1559 (ISSN 1996-1944), according to the experiment illustrated in FIG. 2.

The aim of this experiment was to demonstrate the capacity of the dynamic hologram produced by the LCLV to operate with spatially and temporally complex fields: the multimode fiber MM serves to create fields of "speckles" that are spatially complex, the phase modulation induced via the piezoelectric mirror serves to create temporally complex fields, for a single wavelength derived from the laser.

Figure 3:
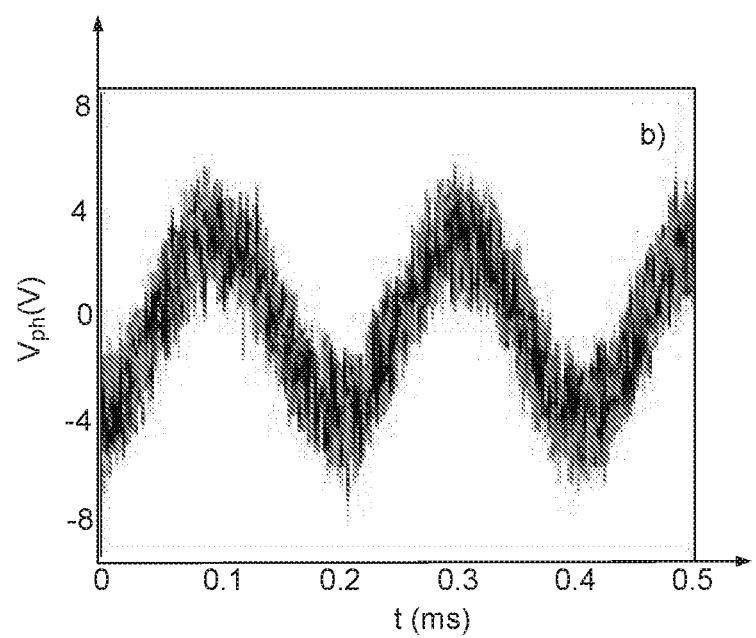
FIG. 3 illustrates the variation of the intensity detected as a function of time.

As illustrated in FIG. 3, a detector PD arranged in a diffracted beam detects the phase modulation induced in the fiber MM by the presence of a temporal modulation of the intensity of the signal detected, the phase modulation/intensity modulation conversion being performed by the LCLV.

The holographic detector HD of the sensor 100 according to the invention further comprises a processing unit UN adapted to identify the section of the fiber assembly OF situated in proximity to the excitation to be located. This identification is made from the N output optical signals detected. In effect, each optical signal Fouti detected bears an information item concerning the phase modulation Δφ, which is reflected in a possible temporal modulation of its intensity about a frequency equal to the center frequency of the phase modulation Δφ.

This information item is detected by the detector PD, then processed by the processing unit UN to identify the section closest to the external excitation which has induced the phase modulation in the fiber.

According to one embodiment, the processing consists in determining, from the N output optical signals detected (Fouti), the output optical signal of lowest index k1 exhibiting the phase modulation (that is to say an associated intensity modulation), the section to be identified Tk1 corresponding to the section having the index k1.

In effect, if the excitation occurs in proximity to the section T1 closest to the end E, all of the optical signals Fouti for all the wavelengths λi, are propagated in this section, and are therefore modulated. The section of lowest index is the section 1 Ti.

Generally, if the excitation occurs in proximity to the section of index k1 Tk1, it is the optical beams of indexes greater than or equal to k1 which are propagated in the section Tk1, the optical beams of lower index 1, . . . , k1-1, already being reflected on the corresponding reflection devices M1, . . . , Mk1. Thus, the section Tk1 is identified.

Thus, the optical fiber assembly OF structured in sections produces a distributed sensor, the wavelength multiplexing making it possible to identify the section located in proximity to the external excitation.

The sensor 100 according to the invention offers many advantages. It is inexpensive, discrete and easy to deploy.

Another advantage is that the sensor 100 exhibits very great sensitivity. In effect, an important feature of adaptive holography is that, for the small phase modulations of amplitude Δφ, the detection is always linear at Δφ therefore the power measured on each output order is directly proportional to the amplitude of the phase modulation, and a direct measurement of Δφ can be made by placing a photodiode on one of the orders diffracted at the output of the LCLV.

Because of the linear nature of the detection, it is possible to measure small signals, which otherwise would be hidden by the noise (for example, if the detection is quadratic, the slope of the measurement curve, which gives the sensitivity, is substantially less). Furthermore, the sensitivity is also increased because of the great phase shift produced by the light valve as a function of the intensity variations, that is to say, the light valve is characterized by a great equivalent coefficient n2 induced by the photoconductor—liquid crystal assembly.

Another advantage is that the optimum detection conditions are automatically maintained by the adaptive nature of the diffraction grating which is capable of following the slow phase variations and adapting thereto. By virtue of this property, the detection of phase modulation at high frequency is insensitive to the low-frequency noises, unlike the standard interferometers for which the linearity has to be maintained by servocontrols.

In effect, the wave-mixing process in the LCLV is greatly selective in frequency and occurs in a very narrow passband.

When the grating is capable of "following" the phase variation, that is to say when this fluctuation varies over a time constant greater than the response time of the liquid crystal, the hologram adapts to the changes of phase at low frequency and the diffracted intensity is unchanged: the low-frequency fluctuations have no effects on the intensity diffracted by the LCLV and the photodiode detects a signal of constant intensity.

When the fluctuation changes over a time constant less than the response time of the liquid crystal (typically frequencies greater than 10 to 100 Hz), the phase modulation of the optical wave is once again in the form of a temporal modulation of the intensity diffracted by the LCLV. For the high frequencies, the LCLV valve behaves as a static hologram which transforms the phase variations into intensity variations on the diffracted wave, and these phase variations are directly measured by the photodiode; furthermore, by the very nature of the adaptive hologram, the intensity variation is linear as long as the phase shift is small.

The small passband (inverse of the response time of the valve) makes it possible to detect phase modulations at high frequency (acoustic) and filter the low frequencies lying in the two-wave mixing band (typically less than 10 to 100 Hz) such as the fluctuations of temperature, of static pressure, certain vibrations.

The capacity of the adaptive hologram registered in the LCLV to follow and neutralize the low-frequency noise makes it possible to produce a phase modulation sensor which remains very effective even in noisy environmental conditions and for complex beams, such as "speckle" fields deriving from an optical fiber.

FIG. 4 illustrates a sensor 100 according to the invention operating with N=3, i.e. three wavelengths $\lambda 1$, $\lambda 2$, $\lambda 3$, according to a first, so-called "parallel" embodiment in which the three wavelengths are emitted simultaneously by three laser sources SL1, SL2, SL3. Preferentially for this embodiment, the sensor comprises N optical detectors indexed i PD1, PD2, . . . PDN, here PD1, PD2, PD3, each detector being adapted to respectively detect an output optical signal of emission wavelength $\lambda i$, here $\lambda 1$, $\lambda 2$, $\lambda 3$, the detection taking place simultaneously for all the detectors.

The fiber assembly comprises, in this example, a plurality of optical fibers, each section Ti, here T1, T2, and T3, comprising a fiber and a reflection device comprising a dichroic mirror MDi, here MD1, MD2 and MD3.

As a nonlimiting example, a sensor according to the invention is described hereinbelow reprising the diagram of FIG. 5 for N=2.

It comprises two sections T1, T2 of multimode fiber OF1, OF2, having a core diameter of 200 microns, a numerical aperture of 0.22 and a length of 5 m.

The light valve is produced with a photoconductive substrate of BSO, photosensitive in the blue-green region of the visible spectrum. The thickness of the liquid crystal LC in the valve is 14 microns.

The disturbance location protocol uses two wavelengths: $\lambda 1$=515 nm and $\lambda 2$=553 nm. These wavelengths are generated by a laser assembly comprising a single laser simultaneously emitting the two wavelengths. The optical system OS incorporates a dichroic mirror used at the output of the laser to split the two wavelengths at the outset.

The intensities of the reference signals are approximately equal, Ir1, Ir2≈0.8 mW/cm2, and the intensities of the two signal beams at the fiber output Is1, Is2≈0.7 mW/cm2.

The protocol for locating the acoustic waves measures a phase modulation induced by a piezoelectric placed in proximity to the fiber sections.

Figure 6:
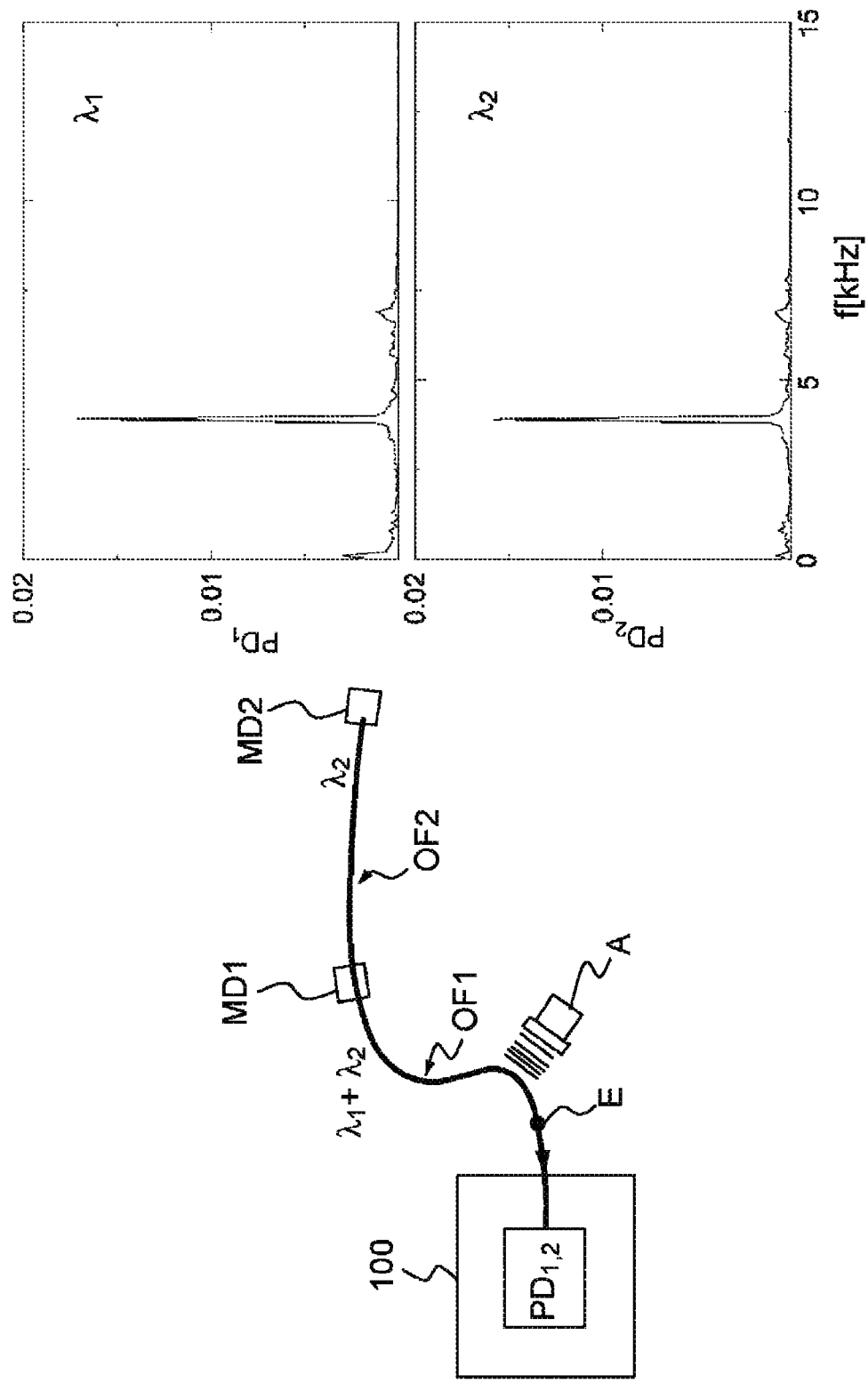
FIG. 6 illustrates an example of detection when the excitation is located in proximity to the first section of the optical fiber assembly of the sensor according to the invention.
Figure 7:
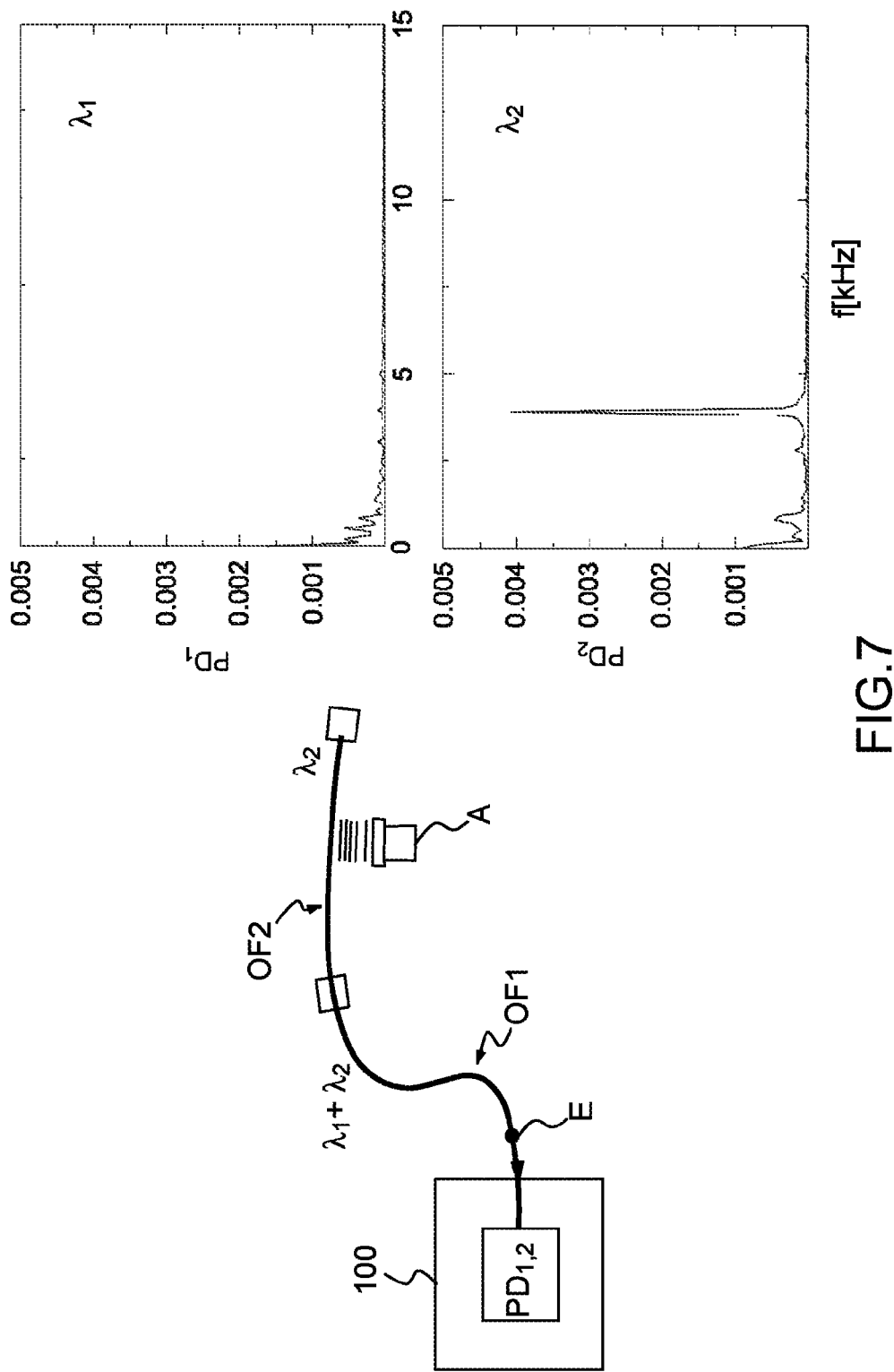
FIG. 7 illustrates an example of detection when the excitation is located in proximity to the last section of the optical fiber assembly of the sensor according to the invention.

An example of detection produced on the photodiodes PD1 ($\lambda 1$) and PD2 ($\lambda 2$) is illustrated in FIGS. 5 to 7.

In the left-hand part of the figures, the position of the acoustic excitation A relative to the fibers OF1 and OF2 can be seen. The right-hand parts show the Fourier spectra of each signal recorded by the two photodiodes, PD1 and PD2. In this example of sensor, the processing unit UN is suitable for computing the Fourier transform of the temporally modulated intensity detected by the photodiodes.

In the absence of disturbance, no signal is recorded (FIG. 5).

If a disturbance is present in proximity to the first fiber OF1, the two photodiodes PD1 and PD2 record a signal (FIG. 6), the section closest to the excitation A corresponds to the section T1, 1 being the lowest index.

If the disturbance relates only to the second fiber OF2, the signal is detected by the single photodiode PD2 detecting the signal at $\lambda 2$ (FIG. 7). The section closest to the excitation A corresponds to the section T2. In effect, when a single modulated signal is detected, it is necessarily the signal corresponding to the wavelength $\lambda N$ of the section TN furthest from the end E.

FIG. 8 illustrates a sensor 100 according to the invention operating with N wavelengths according to a second, so-called "serial" embodiment, in which the N wavelengths are emitted sequentially by a laser source SL0. Preferentially for this embodiment, the sensor comprises a single optical detector PD0, adapted to sequentially detect the output optical signals Fouti of emission wavelength $\lambda i$.

In this example, the optical fiber assembly is formed by a single fiber OF0, and each reflection device Mi comprises a Bragg reflector MBi incorporated in the fiber OF0. The optical system is simplified.

The sensor according to the invention is not limited to the use of wavelengths of the visible spectrum, it can be produced at other wavelengths, for example in the near infrared or IR, in order to be able to use components derived from the telecom field. For this spectral domain, the BSO crystal must be replaced by a crystal that is photoconductive in the IR having the requisite characteristics in terms of quantum photoconduction efficiency, resistivity in the black, and optical quality. The possible photoconductors are for example Si, GaAs, InP, GaP, CdS, CdTe, ZnTe etc.

According to a preferred variant, the fiber assembly OF is produced from one or a plurality of multimode fibers. Generally, the multimode fibers are easier to use (easier alignment and couplings), less brittle, less expensive, and exhibit lesser nonlinear effects than in the single-mode fibers. They are also more sensitive to the variations of length, notably by virtue of the couplings of the multiple modes during the propagation. The phase shift induced by the acoustic wave, is so induced on each of the modes. If there are M modes in the fiber, the optical wave carries M times the phase shift. The gain in sensitivity to the variations of length is equal to the number of modes propagating in the fiber. The sensitive part can thus be simplified, by dispensing with the transducer.

A multimode optical fiber assembly is compatible with an LCLV, which diffracts all the modes which interfere, and therefore the phase shift is amplified by a factor M.

The multimode fibers are not used in a standard interferometer because they operate by two-wave interference. If M modes are made to interfere with one another, it is not possible to correct the slow variations of phase of the fiber for all the modes at the same time, and therefore the contrast is very poor.

Also, the noise originating from the polarization instabilities drastically decreases when the number of modes in the fiber increases. The choice of a multimode fiber with a fairly large diameter (>100 μm) therefore makes it possible to minimize this noise.

As a variant, the fiber assembly, conventionally coated with an epoxy jacket, is coated with a polyimide jacket to better insulate it from the thermal fluctuations and increase the sensitivity to elongation for a given stress.

According to a variant, the fiber assembly is single-mode.

Preferentially, the single-mode fiber assembly is a polarization-maintaining assembly which maximizes the contrast of the interferences.

An example of use of the sensor 100 according to the invention is an underwater acoustic wave sensor, the optical fiber assembly being in this case submerged and the excitation to be detected and to be located consisting of an underwater acoustic wave.

The invention claimed is:

1. An optical fiber sensor for locating an excitation in proximity to an optical fiber assembly, said excitation inducing a modulation of the phase of an optical signal propagating in said optical fiber assembly, said sensor comprising:
   a laser assembly of at least one laser, said laser assembly being configured to emit N laser beams indexed i with N>1, of respective emission wavelength $\lambda i$,
   an optical fiber assembly comprising N successive sections indexed i, each section comprising a selective reflection device for an associated emission wavelength $\lambda i$, the indexes being fixed relative to an end of said fiber assembly,
   an optical system configured to:
      inject, through said end, said laser beams
      receive, through said end, N signal beams indexed i respectively of wavelengths $\lambda i$, each signal beam being derived from the reflection, on the reflection device associated with the wavelength $\Delta i$, of the laser beam of wavelength $\lambda i$ injected then propagated in said fiber assembly,
      generate N reference beams indexed i respectively of wavelengths $\lambda i$, from the laser beam of emission wavelength $\lambda i$,
      produce N interference areas indexed i, each area corresponding to the interference between a reference beam and a signal beam of the same emission wavelength $\lambda i$,
   a holographic detector comprising:
      a liquid crystal light valve comprising a liquid crystal layer arranged between two substrates, one of the substrates comprising a photoconductive material for said N emission wavelengths, said valve being arranged such that it at least partially covers said interference areas, said valve being configured to produce N holograms indexed i respectively from said N interference areas,
      at least one optical detector configured to detect N output optical signals indexed i diffracted respectively by said N holograms,
      a processing unit adapted to identify the section of said fiber assembly situated in proximity to said excitation to be located, from the N output optical signals detected.

2. The sensor as claimed in claim 1, wherein said processing unit is adapted to identify said section by determining, from the N output optical signals detected, the output optical signal of lowest index exhibiting said phase modulation, said section to be identified corresponding to the section having said lowest index.

3. The sensor as claimed in claim 1, wherein said phase modulation of said output optical signal corresponds to a temporal modulation of an intensity of said output optical signal detected.

4. The sensor as claimed in claim 1, wherein the reflection device comprises a dichroic mirror and said optical fiber assembly comprises N optical fibers, each fiber and the associated dichroic mirror corresponding to a section.

5. The sensor as claimed in claim 1, wherein said optical fiber assembly is formed by a single fiber and each reflection device comprises a Bragg reflector incorporated in said fiber.

6. The sensor as claimed in claim 1, wherein said laser assembly consists of a single laser sequentially emitting said emission wavelengths.

7. The sensor as claimed in claim 1, wherein said laser assembly comprises a plurality of N lasers, each laser respectively emitting an emission wavelength.

8. The sensor as claimed in claim 1, comprising N optical detectors indexed i, each detector being adapted to respectively detect an output optical signal of emission wavelength $\lambda i$, the detection taking place simultaneously for all the detectors.

9. The sensor as claimed in claim 1, comprising a single optical detector adapted to sequentially detect said output optical signals.

10. The sensor as claimed in claim 1, wherein said optical fiber assembly is multimode.

11. The sensor as claimed in claim 1, wherein said optical fiber assembly is single-mode and polarization maintaining.

12. The sensor as claimed in claim 1, wherein said optical fiber assembly is submerged and said excitation to be located is an underwater acoustic wave.

13. A method for locating an excitation in proximity to an optical fiber assembly, said excitation inducing a modulation of the phase of an optical signal propagating in said optical fiber assembly, comprising the steps of:
   emitting N laser beams indexed i with N>1, of respective emission wavelength $\lambda i$,
   injecting said N laser beams into an optical fiber assembly, through an end of said assembly, said optical fiber assembly comprising N successive sections, indexed i, each section comprising a selective reflection device for an associated emission wavelength $\lambda i$, the indexes being fixed relative to said end of said fiber,
   receiving, through said end, N signal beams indexed i respectively of wavelengths $\lambda i$, each signal beam being derived from the reflection, on the selective reflection devices associated with the wavelength $\lambda i$, of the laser beam of wavelength $\lambda i$ injected then propagating in said fiber assembly,
   generating N reference beams of index i respectively of wavelengths $\Delta i$, from the laser beam of emission wavelength $\lambda i$,
   producing N interference areas indexed i, each area corresponding to the interference between a reference beam and a signal beam of the same emission wavelength $\lambda i$,
   producing N holograms indexed i from said N interference areas with a liquid crystal light valve comprising a liquid crystal layer arranged between two substrates, one of the substrates comprising a photoconductive material for said N emission wavelengths, said valve being arranged such that it at least partially covers said interference areas, detecting N output optical signals indexed i diffracted respectively by said N holograms, identifying the section of said optical fiber assembly situated in proximity to said excitation to be located, from said N output optical signals detected.

14. The method as claimed in claim 13, wherein the identification step comprises a step consisting in determining, from the N output optical signals detected, the output optical signal of lowest index exhibiting said phase modulation, said section to be identified corresponding to the section having said lowest index.

15. The method as claimed in claim 14, wherein the step of determination of the output optical signal of lowest index exhibiting said phase modulation comprises a step consisting in analyzing, for the N output optical signals, respectively a temporal modulation of the intensity detected.

* * * * *